Patented Nov. 5, 1929

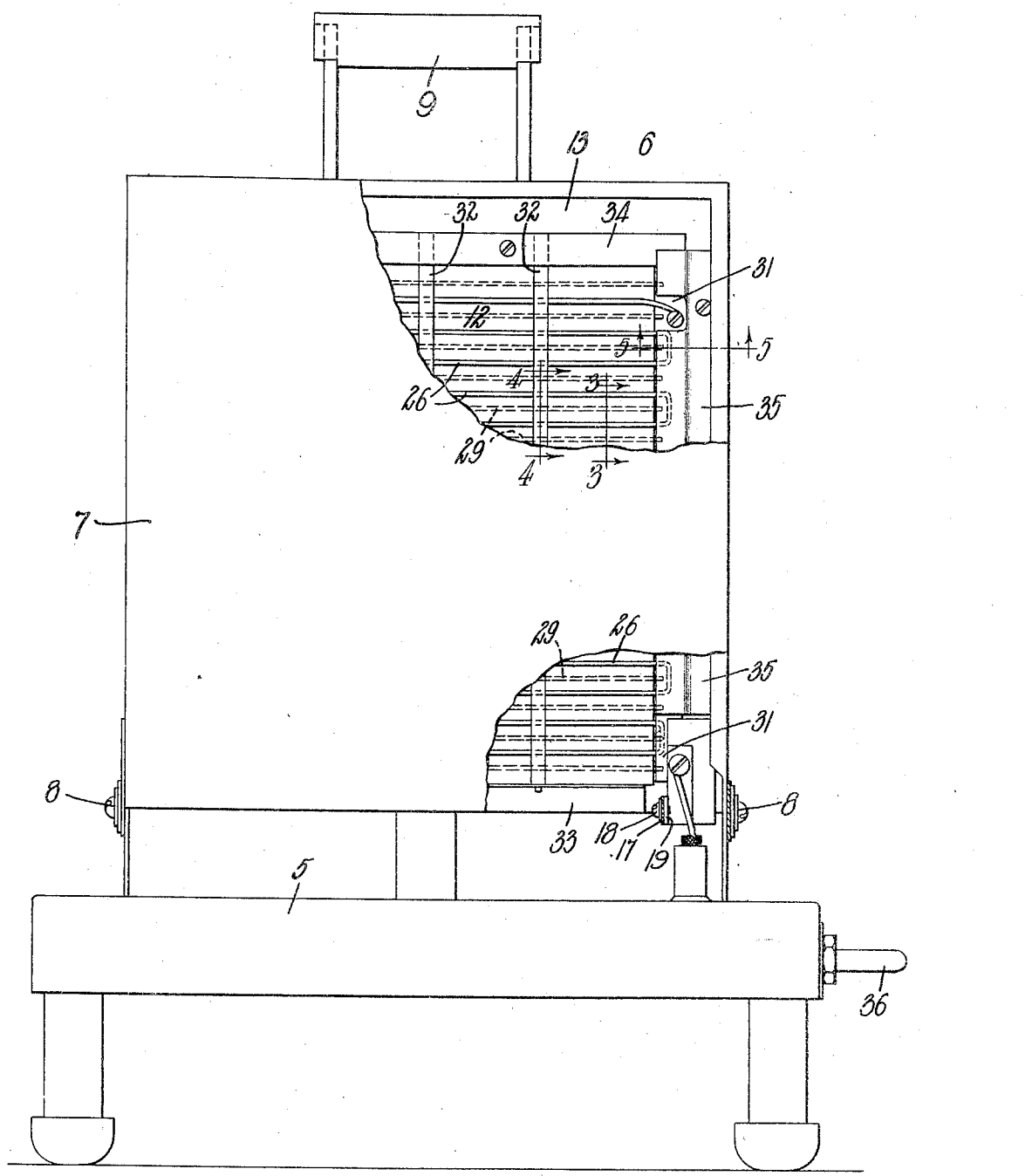

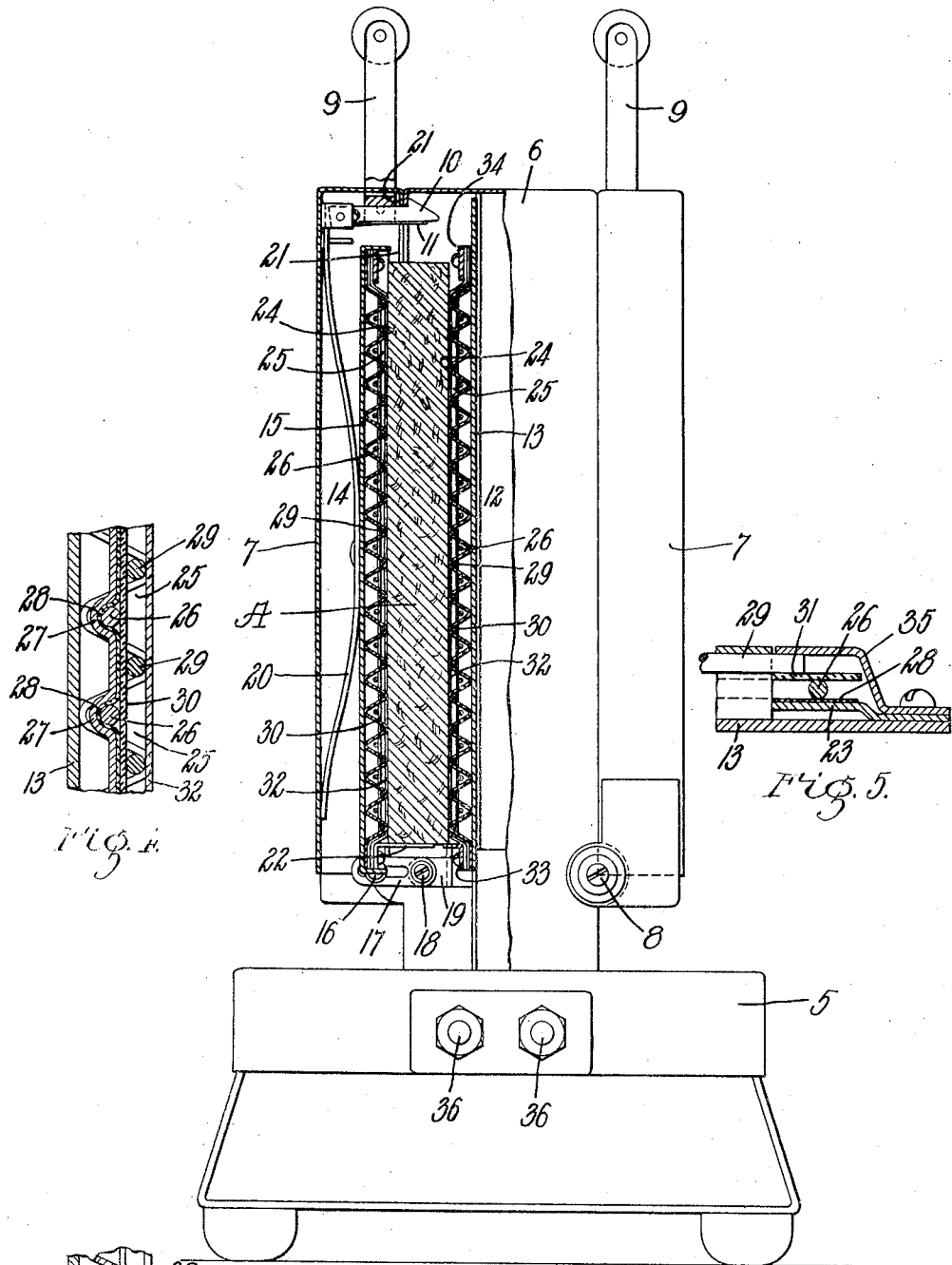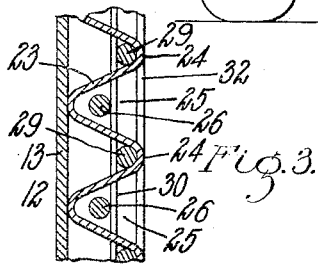

1,734,611

UNITED STATES PATENT OFFICE

DANIEL L. CHANDLER, OF BOSTON, MASSACHUSETTS, ASSIGNOR TO CHAMP ELECTRIC COMPANY, OF BOSTON, MASSACHUSETTS, A CORPORATION OF MASSACHUSETTS

ELECTRIC BREAD TOASTER

Application filed December 14, 1927. Serial No. 240,057.

This invention relates to improvements in toasters, and particularly to an electrical apparatus for toasting bread and the like.

The object of the invention is to provide an improved toasting unit embodying therein a heat radiating member upon which the heating element is mounted, the radiating unit being constructed of corrugated sheet material embodying therein a plurality of parallel grooves and ridges, the latter engaging the bread and positioning the same with respect to the heating element which is located within the grooves, and the grooves, in effect, constituting ovens in which the heat is confined by the ridges.

The invention consists in a toaster for bread and the like as set forth in the following specification and particularly as pointed out in the claims thereof.

Referring to the drawings:

Figure 1 represents a front elevation of a toaster embodying my invention, portions of the same being broken away in order that other portions thereof may be disclosed.

Fig. 2 is a partial side elevation and partial vertical section through the toaster.

Fig. 3 is an enlarged detail sectional view through one of the toasting units as taken on the line 3—3 of Fig. 1.

Fig. 4 is an enlarged detail sectional view through a toasting unit as taken on the line 4—4 of Fig. 1.

Fig. 5 is an enlarged detail section through a toasting unit as taken on the line 5—5 of Fig. 1.

Like numerals refer to like parts throughout the several views of the drawings.

In the drawings, 5 represents a base and 6 is a casing which projects upwardly from said base and is secured thereto in any suitable manner. Covers 7 are provided for the front and rear faces of the casing 6, said covers being pivotally attached at 8 to said casing. The covers 7, which are similar in construction are each provided with a handle 9 and each handle is constructed and arranged to control the operation of a latch 10 by means of which the covers are held in their closed position to the casing 6. The latch 10 is normally held in position to engage the casing 6 by a spring 11 and when it is desired to lower the cover 7, a slight rocking movement of the handle 9 will cause the latch to be disengaged from the casing. Located within the casing 6 is a stationary toasting unit 12 which is mounted upon a holder 13 in turn rigidly secured in any suitable manner to the casing.

Located within a cover 7 is a movable toasting unit 14 which is mounted within a holder 15 and the latter is pivoted at the lower end thereof at 16 to a slotted member 17, in turn pivoted at 18 to a bracket 19 rigidly fastened to the holder 13. Springs 20 fastened to the holder 15 act to force the movable toasting unit 14 into engagement with a slice of bread A when the latter is interposed between the toasting units 12 and 14 as illustrated in Fig. 2. If the opposite faces of the slice of bread are not parallel, the pivot 16 for the movable toasting unit 14 will slide longitudinally upon the grooved member 17 until the toasting unit contacts with the slice of bread, and the toasting unit will tip upon the pivot 16 as permitted by the inclination of the opposite sides of the bread.

The inward movement of the toasting unit 14 toward the unit 12 is limited by an inwardly turned flange 21 provided upon the cover 7, portions of the holder 15 engaging said flange. A bread support 22 is provided upon the holder 15, and when the cover is located in its closed position, this support is located beneath the lower edge of the slice of bread. The toasting units 12 and 14 except for slight differences in the structure of their holders 13 and 15 are exactly the same, and each embodies therein a heat radiating member 23 constructed of corrugated sheet metal having ridges 24 and grooves 25 pressed therein. The crests of the ridges 24 are arcuate in cross sectional contour and have tangential contact with the bread or other articles to be toasted. The heat radiating member 23 of the stationary toasting unit 12 is located in a vertical position at all times and the grooves and ridges thereof extend horizontally thereacross. When the cover 7 is located in its closed position and the movable toasting unit located therein is resting against a slice of bread which has parallel sides, the heat radiating member 23 thereof will also be located in a vertical position and the grooves and ridges thereon will also be extending in a horizontal position thereacross.

Mounted upon each heat radiating member 23 is a heating element 26 comprising a wire constructed of suitable resistance metal, and said wire extends longitudinally through the grooves 25. Seat portions 27 are formed upon the heat radiating member 23 within the grooves 25 for the purpose of supporting the heating element 26 and spacing the same from the surface of the ridges 24. In order to insulate the heating element 26 from the heat radiating member 23, an insulating material 28 is applied to the surface of the radiating member adjacent to the seat portions 27, said insulating material being of such a character that it adheres to the surface of the radiating member.

At the ends of the grooves 25 the heating element is bent around the ends of the ridges and said heating element is insulated from the heat radiating member at this point by a layer of the insulating material 28 which is applied to the surface of the radiating member, see Fig. 5. The heating element is held upon the seat portion 27 by a plurality of wires 29 which extend longitudinally through the ridges 24 and above a strip of insulating material 30 which is located above the heating element at the seat portions, see Figs. 3 and 4.

At the sides of the heat radiating member, a strip of insulating material 31 is interposed between the heating element 26 and the adjacent ends of the wires 29, see Fig. 5. A plurality of thin bars 32 extend across the heat radiating member 23 above the strips of insulating material 30, one end of said bars being detachably secured to an angle plate 33 fast to the holder, and the other end of said bars being clamped beneath a clamping plate 34, also fast to the holder. The heat radiating members of the toasting units 12 and 14 are secured to their respective holders by means of the clamping members 33 and 34 and other clamping members 35 which are located adjacent to the ends of the grooves and ridges. The heating element is connected in any suitable manner to terminals 36 provided upon the base 5.

The general operation of the apparatus hereinbefore specifically described is as follows:—Assuming that a cover 7 is lowered to its open position, a slice of bread A is placed upon the movable toasting unit 14 and the cover is then closed, in which position it is held locked in position to the casing 6 by the latch 10. When the cover is closed, one surface of the slice of bread A engages the crests of the ridges of the heat radiating member 23 of the stationary toasting unit 12 having tangential contact with said ridges and the springs 20 will act to force the movable toasting unit 14 against the opposite surface of the slice of bread, in which position the crests of the ridges of the radiating member 23 upon the holder 15 also have tangential contact with the surface of the bread. If the opposite faces of the slice of bread are perfectly parallel, the toasting units 12 and 14 will both be located in a vertical position. If the opposite faces of the bread are not parallel, the holder 15 of the movable toasting unit 14 will rock upon its pivot 16 and slide within the grooved member 17 until the crest of the ridges of the radiating member engage the surface of the slice of bread, and the springs 15 will then act to hold the movable toasting unit 14 against the bread. In this position, the crests of all the ridges of the heat radiating member are in contact with the surface of the bread and the grooves between the ridges being now entirely closed, will, in effect, constitute small ovens in which the heat is confined between the bread and the surface of the heat radiating member, and there will be no draft in any direction along the surface of the bread to detract from the efficiency of the apparatus.

It will be evident that when the crests of the ridges 24 are in contact with the surface of the bread, that the toasting units will be so positioned that the heating element 26 will be a uniform distance from the surface of the bread.

I claim:

1. In a toaster, a heat radiating member of pressed sheet material provided with a plurality of parallel grooves having seat portions extending transversely thereof, a heating element located within said grooves and resting upon said seat portions, and an insulating material adhering to said radiating member at the sides thereof and at the seat portions and insulating the heating element therefrom.

2. In a toaster, a heat radiating member of pressed sheet material provided with a plurality of parallel grooves having seat portions extending transversely thereof, a heating element located within said grooves and resting upon said seat portions, an insulating material adhering to said radiating member at the sides thereof and at the seat portions, a strip of insulating material resting upon said heating element at the seat portions, and means engaging said strip of insulating material and holding the heating element upon the seat portions.

3. In a toaster, a heat radiating member of pressed sheet material provided with a plurality of parallel grooves having seat portions extending transversely thereof, a heating element located within said grooves and resting upon said seat portions, an insulating material adhering to said radiating member at the sides thereof and at the seat portions, a strip of insulating material resting upon said heating element at the seat portions, and wires extending through the ridges and engaging the strip of insulating material and holding the heating element upon the seat portions.

In testimony whereof I have hereunto set my hand.

DANIEL L. CHANDLER.